United States Patent [19]
Bray

[11] 4,077,883
[45] Mar. 7, 1978

[54] REVERSE OSMOSIS SYSTEM WITH AUTOMATIC PRESSURE RELIEF VALVE

[75] Inventor: Donald Thedore Bray, Escondido, Calif.

[73] Assignee: Desalination Systems, Inc., Escondido, Calif.

[21] Appl. No.: 755,217

[22] Filed: Dec. 29, 1976

[51] Int. Cl.² .............................................. B01D 13/00
[52] U.S. Cl. ................................ 210/136; 210/321 R; 210/433 M; 210/494 M
[58] Field of Search ................. 210/136, 137, 321 R, 210/433 M, 494

[56] References Cited
U.S. PATENT DOCUMENTS

| 3,504,796 | 4/1970 | Bray | 210/321 R |
| 3,746,640 | 7/1973 | Bray | 210/321 R |
| 3,963,612 | 6/1976 | Gossett | 210/321 R |
| 3,967,638 | 7/1976 | Tondreau | 210/321 R |

Primary Examiner—Frank A. Spear, Jr.
Assistant Examiner—E. Rollins Cross
Attorney, Agent, or Firm—Clement H. Allen

[57] ABSTRACT

A restrictor in the form of an elongated small duct or tube is employed for brine or concentrate flow control in a reverse osmosis system. The duct is composed of two portions, one end of one of these portions being connected to the brine output of a semipermeable membrane cartridge, and one end of the other of these two portions being connected to the brine disposal system. The other ends of both these duct portions communicate with the interior of a common compartment which, in turn, communicates through a pressure relief or check valve with the purified water collector of the semipermeable membrane cartridge. When the pressure in the purified water collector exceeds the pressure in the compartment, the check valve opens and purified water flows into the compartment and out through the portion of the elongated small duct or tube leading to concentrate disposal. The two portion small diameter duct or tube thereby acts as a restrictor for concentrate or brine flow control and also for controlling a check or pressure relief valve for pressure control in the purified water collection and storage system.

7 Claims, 5 Drawing Figures

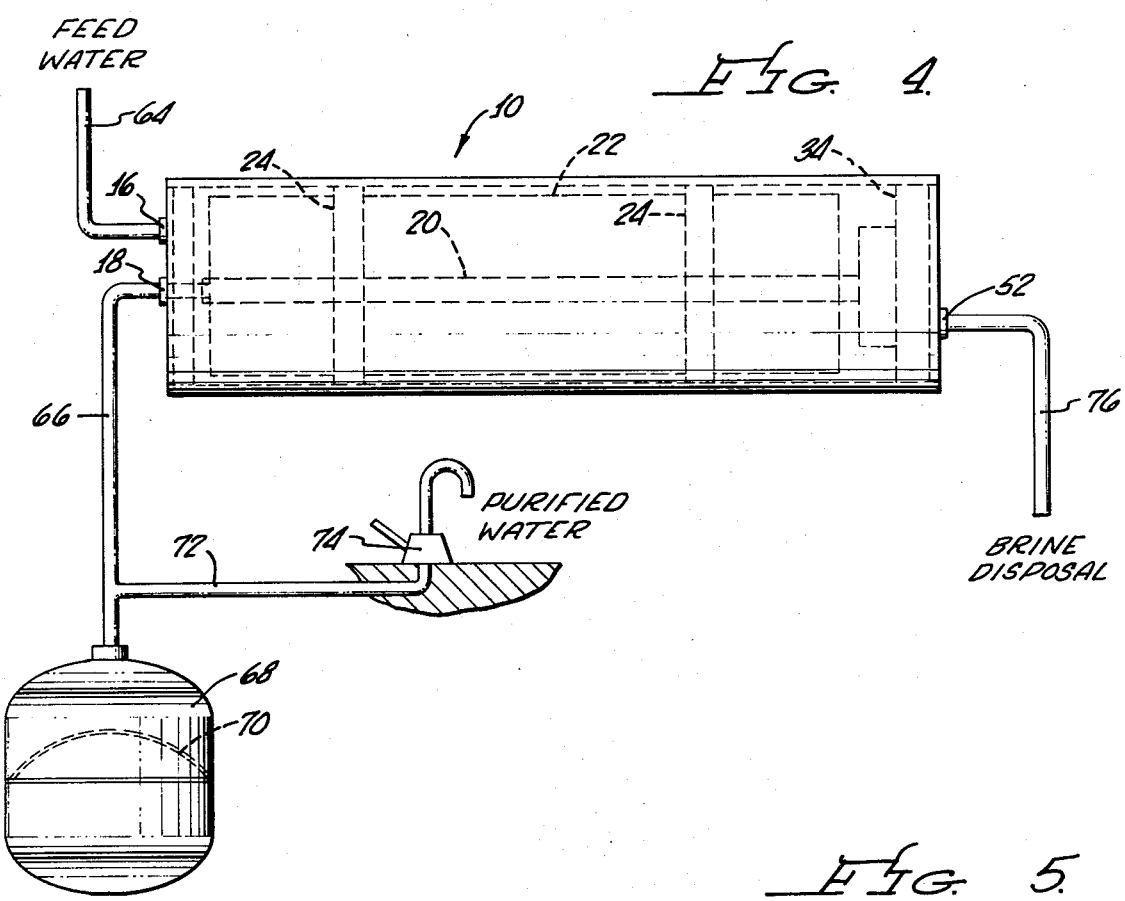
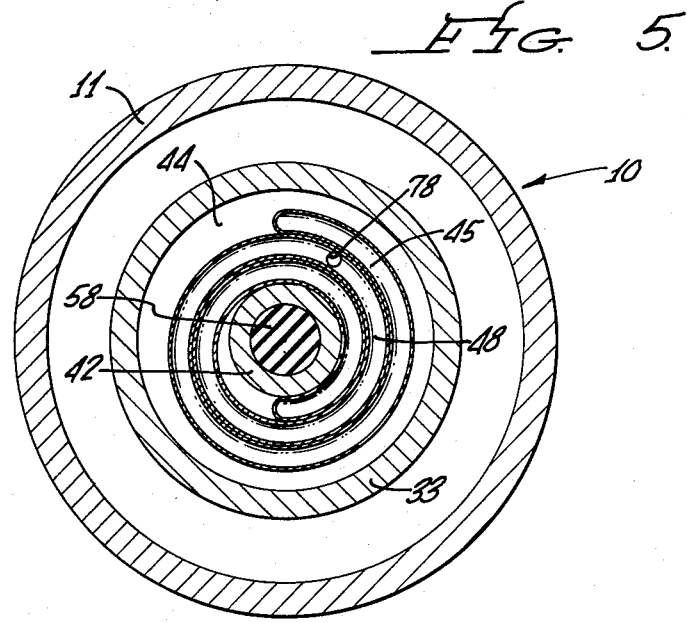

REVERSE OSMOSIS SYSTEM WITH AUTOMATIC PRESSURE RELIEF VALVE

THE BACKGROUND OF THE INVENTION

1. The Field of the Invention

This invention relates to apparatus for treating liquids by reverse osmosis, and more particularly for releasing concentrated liquid from such apparatus.

2. The Prior Art

Reverse osmosis apparatus for treating liquids by reverse osmosis has generally included a pressure resistant container housing a semipermeable membrane or membrane cartridge. Feed liquid at elevated pressure is introduced into the pressure resistant container. Several types of valves and restrictors have been proposed and used for releasing concentrate (often referred to also as brine or blowdown) from the pressure resistant container at a controlled rate so that operating pressure is maintained therein. So-called back pressure control valves have been employed, which may be spring or gas pressure loaded and these are efficient but are complex and expensive. Various types of restrictors have been employed, mainly of the type which cause travel of the concentrate through an orifice or elongated, small diameter channel. An advantage of the long channel restrictor is that a tap may be made into the restrictor channel at a point intermediate its ends and which may be connected to the purified water storage container or system as described in U.S. Pat. Nos. 3,542,199 and 3,568,843. This provides pressure relief for the purified water system at a pressure intermediate the operating pressure and atmospheric pressure, and determined by the location of the tap along the length of the restrictor channel. It has been proposed to employ restricted channels formed by a spirally member abutting a flat plate or surface and an intermediate tap for storage tank pressure relief. Such restrictors are readily produced with a pressure relief tap, but are difficult to produce so that completely uniform channel dimensions are obtained. Even small variations in dimensions, as may be encountered in injection molded plastic parts, may result in channel dimension differences, and imperfect fit between mating pieces may also cause unreliable pressure control characteristics.

A small diameter plastic tube may be extruded to extremely accurate tolerances and can provide a desirable flow restrictor. However, an appreciable length of tubing is most often necessary for proper flow control, and storing several feet or more of tubing within a small membrane or cartridge-containing module presents some problems. Additionally, to form a tap by attaching a tube or fitting at a point intermediate its length is difficult and expensive, especially when it is considered that tubing for flow control for a small household reverse osmosis system, for example, may be of the order of a foot or several feet long, but only twenty-five thousandths of an inch internal diameter.

SUMMARY OF THE INVENTION

Summarized briefly, this invention comprises a semipermeable membrane cartridge enclosed in a pressure resistant container and means for introducing pressurized liquid to be purified into the container, and into an end of the semipermeable membrane cartridge. Means are provided for collecting purified liquid produced by the semipermeable cartridge. The concentrate produced in the pressure resistant container at the other end of the semipermeable cartridge is released therefrom through an elongated small duct or tube, preferably comprising two portions or sections. One end of one of these duct portions communicates with the concentrate end of the semipermeable cartridge; one end of the other portion of the duct communicates with the brine or concentrate disposal system. Both other ends of these two small duct portions communicate with a common compartment. Preferably the small duct comprises two separate portions, each having at least an open end enclosed in the compartment. Or the small duct may comprise two portions in a continuous length, the other end of each of the portions being defined by a common aperture through the wall of the small diameter duct, and which communicates with the interior of the compartment.

At least the inner ends of the small duct portions are enclosed in the compartment, which is preferably of annular form with the small duct in the form of a tube coiled around its hub.

A passage including a check valve connects the interior of the compartment with the means for collecting purified water from the semipermeable membrane cartridge. The check valve is adapted to close when the pressure of liquid within the compartment exceeds the pressure in the means for collecting purified liquid. The check valve is adapted to open when the pressure in the means for collecting purified liquid exceeds the pressure of liquid within the compartment to allow excess purified liquid to drain out of the concentrate disposal system.

BRIEF DESCRIPTION OF THE DRAWINGS

In the drawings:

FIG. 4 shows apparatus comprising a reverse osmosis system employing the module of FIG. 1.

FIG. 5 shows a vertical cross section view, corresponding to that of FIG. 2, of a modified embodiment of this invention.

DESCRIPTION OF A PREFERRED EMBODIMENT

Figure 1:
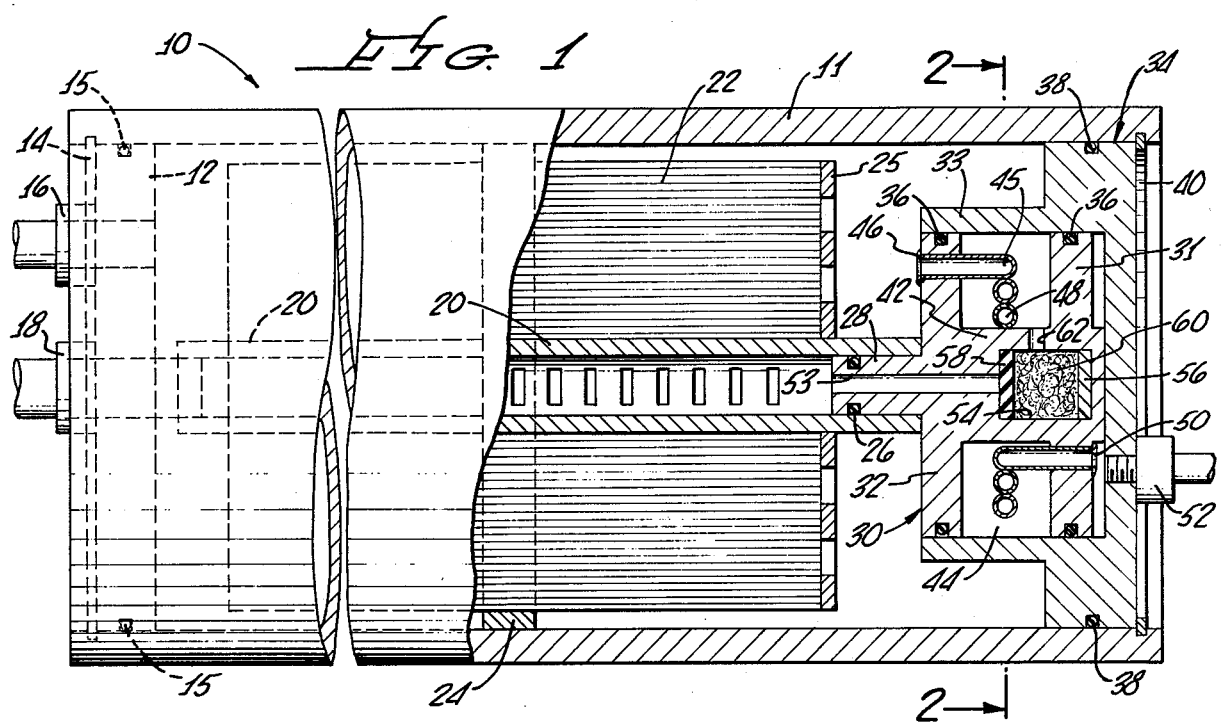
FIG. 1 shows a side view, partly broken out, of reverse osmosis apparatus embodying features of this invention.
Figure 2:
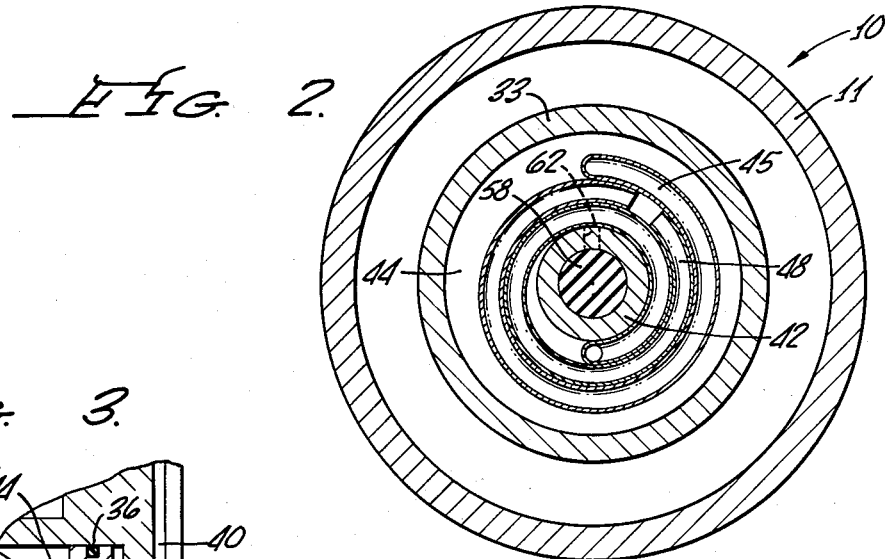
FIG. 2 shows a vertical cross section of the apparatus of FIG. 1, taken along the line 2—2.

Referring now particularly to FIGS. 1 and 2, module 10 comprises a pressure resistant container 11 having an end plate 12 maintained in place by conventional snap ring 14 and sealed to the inner wall of pressure resistant container 11 by resilient "O" ring 15. Feed water connector 16 passes sealingly through end 12 and communicates with the interior of pressure resistant container 11. A second connector 18 also passes sealingly through end 12 and communicates with and is conventionally sealed to the protruding end of central purified liquid collector 20 of a semipermeable membrane cartridge 22 housed within pressure resistant container 11. The outer periphery of semipermeable membrane cartridge 22 is sealed to the interior wall of pressure resistant container 10 by a suitable resilient band seal 24. Connector 16 will be connected to a source of liquid to be purified and transfers this liquid through end plate 12 and into one end of semipermeable membrane cartridge 22. Connector 18 will be connected to apparatus for storing and dispensing purified liquid, as described more particularly hereinafter. The other end of semipermeable membrane cartridge 22 is fitted with perforated anti-telescoping plate 24, and the protruding end of central purified water collector 20 is connected and sealed by resilient "O" ring 26 to extension 28 of spool 30. The two flanges 31 and 32 of spool 30 are fitted into projecting collar 33 of downstream end plate 34, and sealed thereto as by resilient "O" rings 36; end plate 34 being sealed to the inner wall of pressure resistant container 11 by resilient "O" ring 38 and maintained in place by conventional snap ring 40. Spool core 42 forms the inner wall or hub, collar 33 forms the outer wall, and flanges 31 and 32 form the end walls of a compartment 44 in which is coiled a length of duct in the form preferably of small diameter tubing composed, in the embodiment illustrated, of a portion 45 whose one end communicates through a perforation in flange 32, and to which its sidewall is sealed as by application of sealing adhesive at 46, with the brine or concentrate outlet end of semipermeable membrane cartridge 22 through the adjacent portion of pressure resistant container 10. Another portion 48 of the length of duct in the form of small diameter tubing coiled within compartment 44 has one of its ends communicating through a perforation in flange 31, to which its sidewall is sealed as by application of a sealing adhesive as at 50, with the brine or concentrate disposal system through the space between the outer surface of flange 31 and the inner surface of end plate 34 and through brine or concentrate disposal connector 52. The other ends of both elongated small duct portions 45 and 48 are open and communicate with the interior of compartment 44.

Spool extension 28 is provided with bore 63 communicating with the interior of purified liquid collector 20 at its inner end and formed with expanded or cylinder section 54 at its outer end sealed with tight fitting plug 56. In cylinder section 54 of bore 53 is slidably arranged a resilient disc 58, as of rubber, urged normally against the opening of bore 53 by a light spring member such as resilient and porous backing pad 60, which may advantageously be fabricated of porous and compressible foam rubber or synthetic elastomer. Cylinder 54, with disc or flapper 58 adapted to open or close the opening of bore 53 at a critical pressure, acts as a pressure relief valve, the interior of cylinder section 54 communicating with the interior of compartment 44 through passageway 62.

Figure 3:
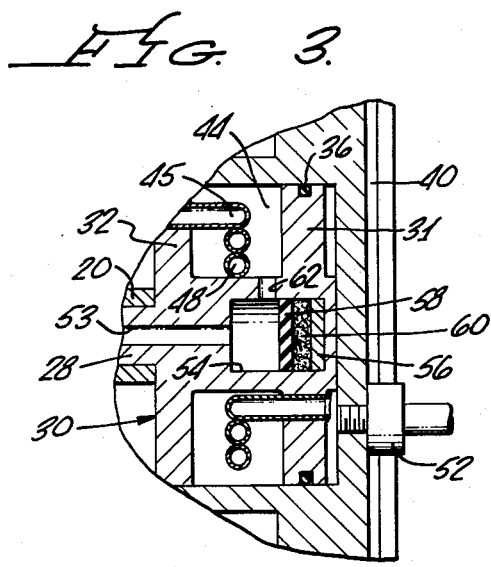
FIG. 3 shows a fragmentary view of the relief valve in the module of FIG. 1 in open position.

In FIG. 2, disc or flapper 58 is shown in the left hand position (in the drawing), thus closing communication between the purified water bore 53 and the brine disposal system. In FIG. 3, disc or flapper 58 is shown in the right hand position (in the drawing), as it will be positioned by a pressure in the purified water collection system higher than the control pressure determined by the restrictor duct or tube length between the brine outlet of the cartridge 22 and the duct portion outlet inside compartment 44.

It will be seen that compartment 44, which encloses coiled small duct or tube portions 45 and 48, is sealed except for passageway 62 which connects its interior to the interior of cylinder 54.

Referring now to FIG. 4, a reverse osmosis system employing the module of FIGS. 1 and 2 comprises a source of pressurized impure liquid or feed water carried through pipe 64 which may be a municipal water main, or branch plumbing, and which is connected to connector 16 of module 10. Connector 18 of module 10 is connected by pipe 66 to the upper compartment of purified water tank 68 whose lower compartment is separated from the upper compartment by an impermeable, flexible diaphragm 70. The lower compartment of tank 68 contains a driving fluid under pressure, such as compressed air, for example, at 10 to 40 pounds per square inch, which acting through diaphragm 70 maintains purified water in its upper compartment under pressure for transfer through pipe 72 to point of use as faucet 74. This system for purified water supply and storage is described and claimed in Pat. No. 3,493,496. A suitable pipe 76 is arranged for transfer of brine or concentrate released from the exterior end of small diameter tube portion 48 through connector 52 to drain or sewer.

The elongated small diameter duct to tube composed of portions 45 and 48 provides a restrictor to maintain operating pressure inside pressure resistant container 10 while allowing release of brine or concentrate from connector 51 and pipe 76.

The total length and inside diameter of the small diameter duct or tube will determine the degree of restriction of brine flow; for example, a tube 3 feet long of 0.025 inch inside diameter can maintain an operating pressure of 35 to 40 psi within a module into which is fed municipal water at about 60 psi. A brine flow of about 50 gallons per day can be released. As will be understood, the pressure of liquid in the elongated small duct or tube will drop proportionately along its length from operating pressure at the one end of portion 45 at 46 to approximately atmospheric pressure at the end of portion 48 at 50. If municipal water is being purified, it may enter module 10 at, for example, 60 psi, and be at 60 psi at the small duct or tube end at 46. The relative lengths of small diameter duct or tube portions 45 and 48 determines the pressure of liquid inside compartment 44, since the pressure drop along the length of portion 45 will be the same relative proportion of the total pressure drop along the combined lengths of portions 45 and 48 as the length of portion 45 will be to the total length of portions 45 and 48. For example, if the total pressure drop along the total length of small diameter tube portions 45 and 48 is 60 psi, and portion 45 is one-half the total length of the two portions, then the pressure of liquid at the end of portion 45 and inside compartment 44 will be 30 psi, or one-half the total pressure drop. The interior of cylinder 54 on the right hand side of rubber disc 58 will also be maintained at 30 psi because of its communication through passage 62 with the interior of compartment 44. Therefore, rubber disc 58 seals the opening of bore 53 while the pressure of purified water in the purified water collection and storage system is lower than 30 psi as shown in FIG. 1. If, however, semipermeble membrane cartridge 22 continues to produce purified water which passes to storage in the upper compartment of storage tank 68 without withdrawal of purified water from faucet 74, then pressure builds up in the purified water collection and storage system and the working pressure drop across the membranes in cartridge 22 is correspondingly reduced. Pressure build-up continues until the pressure on the purified water side of rubber disc 58 exceeds the pressure on its right hand side, namely (in the example) 30 psi, and under these conditions rubber disc 58 will be moved to the right as shown in FIG. 3, and communication will be established between the purified water system and the brine or concentrate disposal system so that excess purified water will flow through bore 53 and cylinder 54, passageway 62, compartment 44, small duct or tube portion 48, and out brine disposal connector 52.

Thus, pressure relief in the purified water system is accomplished, and pressure in this sytem is controlled at a maximum of about 30 psi. If purified water is withdrawn from storage tank 68 by opening faucet 74, pressure falls in storage tank 68 and the purified water system; and pressure in compartment 44 also closes or maintains closed the relief valve formed by rubber disc 58 sealing the outlet end of bore 53 of spool extension 28 and which leads into cylinder 54. Thus, connection for excess purified water to brine disposal is again closed.

In operation of the reverse osmosis apparatus of this invention, the relative lengths of the portions 45 and 48 of the elongated small duct or tube are chosen to provide the desired pressure drop along the length of portion 45 to provide the desired pressure relief control for the purified water collection system. Pressurized feed water, for example from a municipal water supply at a pressure of about 60 psi, may require the lengths of duct or tube portions 45 and 48 to be of about equal to provide a purified water pressure relief control of about 30 psi. Purified water is produced in semipermeable membrane cartridge 22 and stored in the top portion of tank 68. The bottom portion of tank 68 contains air under initially, say 10 to 20 psi, pressure. When the output of purified water from cartridge 22 exceeds the amount drawn from faucet 74, pressure will build up in the purified water system, including the collection tube 20 and storage container 68. When this pressure exceeds 30 psi, the pressure inside bore 53 exceeds the pressure on the other side of rubber disc 58, and this is forced to the right (in the drawings); thus opening compartment 44 and the purified water connection out of small diameter tube section 45 to the brine disposal system through passage 62, small diameter tube section 48 and out of brine disposal connector 52. When the pressure has been reduced, disc 58 again moves to the left to permit pressure to increase again in the purified water system. Control of the relief pressure for the purified water system is, therefore, automatic with excess draining off through the brine or concentrate disposal system.

In FIG. 5 is shown an alternative embodiment of the elongated small diameter duct or tube element of the reverse osmosis apparatus of this invention. In this embodiment, the elongated small diameter duct or tube is formed as a continuous length with a perforation in its wall at 78 defining the ends of duct portions 45 and 58 inside compartment 44. Perforation 78 provides communication at this point between these ends of duct or tube portions 45 and 48, and the interior of compartment 44. Perforation 78 is located along the length of the small duct or tube so that the relative lengths of portions 45 and 48 on either side of perforation 78 will provide the required pressure drop for purified water pressure control as in the embodiment illustrated in FIGS. 1 to 3.

The resistor arrangement of this invention employing a length of small diameter duct, preferably of extruded hollow cylindrical plastic tubing, is much superior to resistor arrangements in which channels or grooves result from cooperative disposition of grooved or threaded elements, such as a spirally grooved element abutting a smooth surface. It is difficult and expensive in commercial production to produce grooved or threaded elements and cooperating plates or pieces of sufficiently accurate dimensions to provide desired uniformity of resistor impedance to liquid flow. Also, any foreign material lodging between mating or abutting surfaces may destroy groove dimension accuracy and resistor efficiency. On the other hand, small diameter plastic tubing is commercially produced and marketed in almost unlimited lengths to extremely accurate dimension tolerances and at low cost. Small diameter plastic tubing is, however, difficult to tap into directly to form a connection for a relief valve to control storage system pressure. Some sort of connecting tube or pipe would have to be attached and carefully fitted and sealed to the edge of a perforation in the tube, which is itself of necessary small diameter to produce the required restriction in liquid flow. The organization of this invention completely overcomes this disadvantage because a perforation, or the equivalent open ends of the tube portions communicate with the interior of a compartment in which the small diameter tubing is contained, and the interior of the compartment communicates with the pressure relief valve through a passageway in a wall of the compartment. No direct connection need be made to the perforation in the small diameter tubing itself, or the open ends of tube portions, so that expense and difficulty of connection attachment is avoided, while the accuracy and low cost of extruded plastic tubing can be advantageously realized.

The embodiment illustrated in which the length of small diameter tubing is coiled around hub 42 of annular compartment 44 provides neat, compact and efficient storage of a long length of small diameter tubing within a small space. The tubing may be spirally or helically coiled with as many turns as will be required and which can be accommodated in the compartment volume. A flat spiral coil has been shown in FIGS. 1, 2 and 5 for clarity and ease of understanding.

The pressure exerted against disc 58 to place it normally against the opening of bore 53 into cylinder 54 need only be light; the principal control being exerted by the pressure of liquid in compartment 43 communicated through passageway 62 and the pores of porous foam rubber pad 60 against the right hand face of rubber disc 58.

It will be apparent that compartment 44 enclosing at least the inner ends of the small diameter tube portions is sealed except for the small diameter tube perforation and passage 62 communicating with cylinder section 54, which is part of the check valve controlling the pressure in the purified water system. This compartment has a dual function—it encloses at least the inner ends of portions of a relatively long length of small diameter tubing to act as a container or housing; and it forms a chamber communicating with the interior ends of the small diameter tube portions or the perforation in the small diameter tube wall, and with the check valve which provides the control for pressure relief in the purified water system. The compartment eliminates need for any direct connection to the important and critical small diameter tube ends or perforation, which provides pressure relief for the purified water containing system at a pressure which is a proportion of the operating pressure inside the pressure resistant container. The operation of the pressure relief valve, directing excess purified water into the brine disposal system, thereby becomes automatic at a pressure which is a portion of the pressure drop along the restrictor duct or tube.

I claim:

1. Reverse osmosis apparatus comprising a semipermeable membrane cartridge enclosed in a pressure resistant container; means for introducing pressurized liquid to be purified into said pressure resistant container and into said semipermeable membrane cartridge; means for releasing concentrated liquid from said semipermeable membrane cartridge and from said pressure resistant container while maintaining operating pressure therein; and means for collecting purified liquid from said semipermeable membrane cartridge; in which the improvements comprise:

a. said means for releasing said concentrated liquid from said pressure resistant container while maintaining operating pressure therein comprising an elongated small duct;
   b. said elongated small duct comprising two portions, one end of said portions communicating with the concentrate outlet end of said semipermeable membrane cartridge, one end of one of said portions communicating with means for disposal of said concentrated liquid, and the other ends of both of said portions of said duct communicating with the interior of a common compartment;
   c. said compartment sealed except for passage means provided with a check valve between the interior of said compartment and said means for collecting purified water from said semipermeable membrane cartridge; and
   d. said check valve adapted to close when the pressure of liquid within said common compartment exceeds the pressure of purified liquid in said means for collecting purified liquid, and said check valve adapted to open when the pressure of purified liquid in said means for collecting purified liquid exceeds the pressure of liquid within said common compartment.

2. Reverse osmosis apparatus according to claim 1, in which said elongated small duct is composed of two separate portions, the said one end of each of said portions being an open end communicating with the interior of said compartment.

3. Reverse osmosis apparatus according to claim 1, in which said elongated small duct is composed of one continuous length with an aperture in the wall of said duct communicating with the interior of said compartment.

4. Reverse osmosis apparatus according to claim 1, in which said compartment is of annular form and said elongated small duct is a small diameter tube coiled inside said annular compartment.

5. Reverse osmosis apparatus according to claim 1, in which said elongated small diameter tube is fabricated of extruded plastic.

6. Reverse osmosis apparatus according to claim 4, in which said elongated small diameter tube is coiled around the central hub of said annular compartment.

7. Reverse osmosis apparatus according to claim 4, in which the lengths of each of said elongated small diameter tube portions are about equal.

* * * * *